United States Patent
Cohen

(10) Patent No.: US 10,133,053 B2
(45) Date of Patent: Nov. 20, 2018

(54) APPARATUS AND METHOD FOR GENERATING IN-FOCUS IMAGES USING PARALLEL IMAGING IN A MICROSCOPY SYSTEM

(71) Applicant: MOLECULAR DEVICES, LLC, Sunnyvale, CA (US)

(72) Inventor: Avrum I. Cohen, Downingtown, PA (US)

(73) Assignee: Molecular Devices, LLC, San Jose, CA (US)

( * ) Notice: Subject to any disclaimer, the term of this patent is extended or adjusted under 35 U.S.C. 154(b) by 270 days.

(21) Appl. No.: 14/778,369

(22) PCT Filed: Apr. 29, 2014

(86) PCT No.: PCT/US2014/035796
§ 371 (c)(1),
(2) Date: Sep. 18, 2015

(87) PCT Pub. No.: WO2014/179269
PCT Pub. Date: Nov. 6, 2014

(65) Prior Publication Data
US 2016/0131890 A1    May 12, 2016

Related U.S. Application Data

(60) Provisional application No. 61/817,869, filed on Apr. 30, 2013.

(51) Int. Cl.
*G02B 21/16* (2006.01)
*G02B 21/36* (2006.01)
(Continued)

(52) U.S. Cl.
CPC ........... *G02B 21/367* (2013.01); *G02B 21/06* (2013.01); *G02B 21/16* (2013.01); *G02B 21/244* (2013.01);
(Continued)

(58) Field of Classification Search
CPC .............................. G02B 21/367; G02B 21/34
See application file for complete search history.

(56) References Cited

U.S. PATENT DOCUMENTS 7,113,651 B2 * 9/2006 Liang .................... G01J 3/2823
348/E5.028
7,139,415 B2 * 11/2006 Finkbeiner ........... G01N 21/253
382/128
(Continued)

FOREIGN PATENT DOCUMENTS

JP    WO2012153727    * 11/2012

*Primary Examiner* — Jayanti K Patel
*Assistant Examiner* — Irfan Habib

(57) ABSTRACT

A method of generating in-focus images of measurement locations of a sample holder in a microscopy imaging system is provided. A camera array is positioned at a first distance from the sample holder. A first image of a measurement location is acquired using an imaging device disposed on the camera array. A candidate output image associated with the imaging device is developed in accordance with the first image. The camera array is positioned at a second distance from the sample holder and a second image of the measurement location is acquired using the imaging device. A portion of the candidate output image is updated in accordance with a portion of the second image in accordance with a selection criterion. The updated candidate image is transmitted.

20 Claims, 5 Drawing Sheets

(51) Int. Cl.
*G02B 21/06* (2006.01)
*G02B 21/34* (2006.01)
*H04N 7/18* (2006.01)
*G02B 21/24* (2006.01)
*G02B 7/38* (2006.01)

(52) U.S. Cl.
CPC ............. *G02B 21/34* (2013.01); *H04N 7/183* (2013.01); *G02B 7/38* (2013.01)

(56) References Cited

U.S. PATENT DOCUMENTS

| | | | | |
|---|---|---|---|---|
| 7,345,814 B2* | 3/2008 | Yoneyama | ............ | G02B 21/16 250/201.3 |
| 7,456,377 B2* | 11/2008 | Zeineh | ................ | G02B 21/365 250/201.3 |
| 7,646,482 B2* | 1/2010 | Jiang | .................... | G01N 21/253 356/326 |
| 7,646,495 B2* | 1/2010 | Olsen | .................... | G02B 21/002 356/624 |
| 7,659,991 B2* | 2/2010 | Seitz | ................. | G01N 21/4795 356/497 |
| 7,801,352 B2* | 9/2010 | Uchiyama | ............ | G02B 21/367 382/133 |
| 7,885,447 B2* | 2/2011 | Oshiro | ................ | G02B 21/365 359/362 |
| 8,106,942 B2* | 1/2012 | Cooke | .................... | G02B 21/367 348/79 |
| 8,126,250 B2* | 2/2012 | Cooke | .................... | G02B 21/367 382/133 |
| 8,564,623 B2* | 10/2013 | Cohen | .................... | G02B 21/367 345/634 |
| 8,687,180 B2* | 4/2014 | Cohen | .................... | G01B 9/04 356/124 |
| 9,030,548 B2* | 5/2015 | Zhou | .................... | G02B 21/002 348/80 |
| 9,128,296 B2* | 9/2015 | Steinborn | ............ | G02B 21/241 |
| 9,229,212 B2* | 1/2016 | Oshiro | ................ | G02B 21/002 |
| 9,291,450 B2* | 3/2016 | Takahashi | ............... | G01B 11/24 |
| 9,325,966 B2* | 4/2016 | Tin | ........................ | G01N 21/55 |
| 9,332,190 B2* | 5/2016 | Murakami | ........... | G02B 21/365 |
| 9,366,630 B2* | 6/2016 | Bouzid | ............. | G01B 11/0608 |
| 9,551,568 B2* | 1/2017 | Zhou | .................... | G02B 21/26 |
| 9,578,227 B2* | 2/2017 | Hulsken | ............... | G02B 21/241 |
| 9,632,301 B2* | 4/2017 | Damaskinos | ........... | B82Y 35/00 |
| 9,638,573 B2* | 5/2017 | Gouch | ................ | G02B 21/245 |
| 9,835,837 B2* | 12/2017 | Gouch | ................ | G02B 21/367 |
| 2003/0179387 A1* | 9/2003 | Uno | .................... | G01B 11/026 356/624 |
| 2004/0057094 A1* | 3/2004 | Olszak | ................ | G02B 21/367 359/198.1 |
| 2007/0115484 A1* | 5/2007 | Huang | ................ | G01B 11/2527 356/604 |
| 2008/0054156 A1* | 3/2008 | Fomitchov | ............... | G02B 7/36 250/201.3 |
| 2008/0099661 A1* | 5/2008 | Virag | .................... | G02B 21/242 250/201.3 |
| 2010/0060883 A1* | 3/2010 | Heiden | .................... | G02B 7/32 356/126 |
| 2011/0091125 A1* | 4/2011 | Kenny | ................ | G02B 21/367 382/254 |
| 2013/0260396 A1* | 10/2013 | Akcakir | ............... | G01N 15/0211 435/7.25 |
| 2014/0079337 A1* | 3/2014 | Kondo | .................... | G06T 3/40 382/276 |

* cited by examiner

APPARATUS AND METHOD FOR GENERATING IN-FOCUS IMAGES USING PARALLEL IMAGING IN A MICROSCOPY SYSTEM

RELATED APPLICATION

This application claims the benefit of U.S. Provisional Patent Application Ser. No. 61/817,869, filed Apr. 30, 2013, the content of which is incorporated by reference herein in its entirety.

TECHNICAL FIELD

This invention relates to automated and semi-automated microscopy for cell biology and other similar research and in particular relates to high content screening microscopy imaging systems.

BACKGROUND

Researchers may use microscopy imaging systems during high-content screenings (HCS) to obtain images of microscopy samples. A sample holder—e.g., a microtiter plate, slide, dish, etc.—may support the microscopy samples during the screening process. Automated microscopy imaging systems may include an objective coupled to an electronic imaging device such as a charge-coupled device (CCD) or a complementary metal-oxide-semiconductor (CMOS) chip to produce the images of the microscopy samples. The position of the objective relative to the sample holder may be adjusted to bring the microscopy samples into focus on the imaging device.

The microscopy samples may reside at various measurement locations (e.g., wells) on the upper surface of the sample holder. Accordingly, the objective of the microscopy imaging system may be positioned at a focal position relative to the top or the bottom of the sample holder in order to obtain an in focus image of a microscopy sample. Variations in the thickness or curvature of the sample holder, however, may prevent accurate focus over a range of measurement locations. As a result, the focal position of the objective may need to be corrected at each measurement location in order to obtain respective in focus images for all measurement locations. Because high content screenings may image hundreds or thousands of measurement samples, some microscopy imaging systems may be configured to automatically perform focus maintenance at each measurement location.

To increase the efficiency of imaging, multiple imaging devices may be used to image a plurality of wells in parallel (i.e., simultaneously). However, the time required to focus the objective of each of the multiple imaging devices may eliminate any efficiencies that may be gained from parallel imaging. Further, focusing each objective individually may also increase the complexity of the imaging system.

Therefore, improved systems and methods for generating in-focus images of a plurality of measurement locations using imaging devices operating in parallel in a high content screening microscopy-imaging system are needed.

SUMMARY

A method of generating in-focus images of measurement locations of a sample holder in a microscopy imaging system is provided. A camera array is positioned at a first distance from the sample holder. A first image of a measurement location is acquired using an imaging device disposed on the camera array. A candidate output image associated with the imaging device is developed in accordance with the first image. The camera array is positioned at a second distance from the sample holder and a second image of the measurement location is acquired using the imaging device. A portion of the candidate output image is updated with a portion of the second image in accordance with a selection criterion. The updated candidate image is transmitted.

A microscopy imaging system for acquiring in-focus images of a plurality of measurement locations of a sample holder is also provided. A camera array comprises a plurality of imaging devices. A motion controller positions the camera array relative to the sample holder. A pre-processing module is associated with an imaging device of the plurality of imaging devices and receives images acquired by the imaging device. The motion controller positions the camera array at a plurality of distances from the sample holder and the imaging device acquires a plurality of images, wherein each of plurality of images is acquired at a respective one of the plurality of distances. The preprocessing module develops an in-focus image associated with the imaging device from the plurality of images.

DETAILED DESCRIPTION

Figure 1:
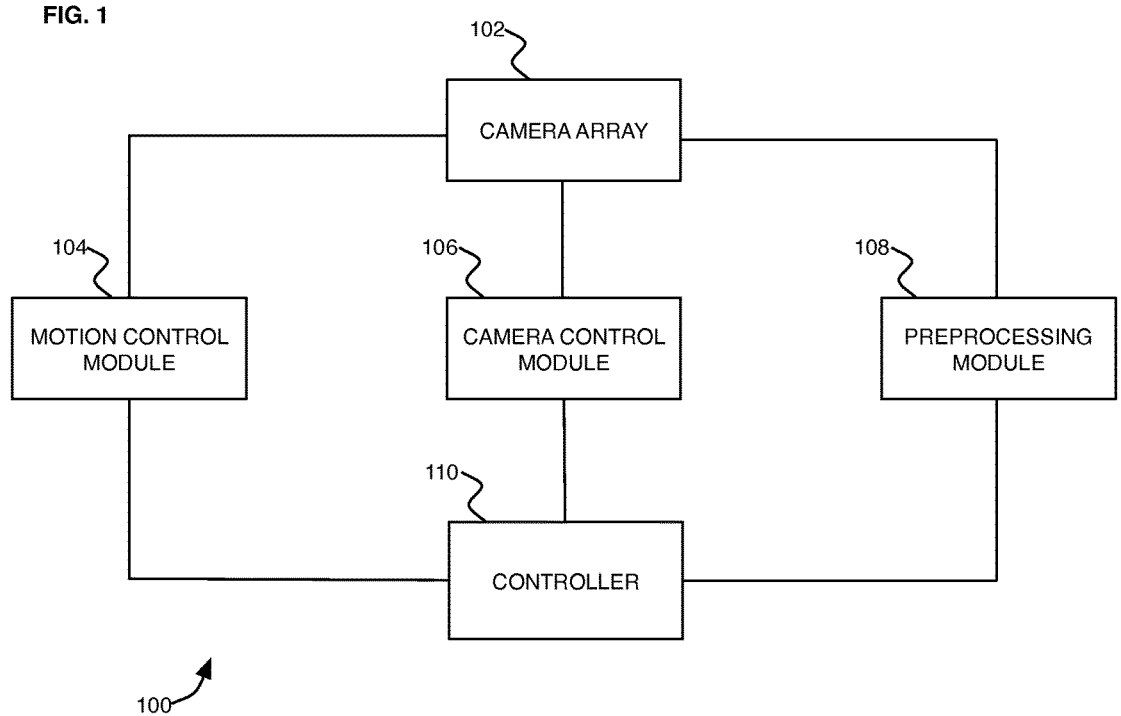
FIG. 1 is a schematic drawing of a parallel image acquisition system.

Referring to FIG. 1, a system 100 for imaging a test plate in parallel comprises a camera array 102, a motion control module 104, a camera control module 106, a pre-processing module 108, and a controller 110. As described further below, the camera array 102 may include imaging devices disposed on a holder in a two dimensional pattern.

During operation, the camera array 102 is positioned under a sample holder to be imaged. In some embodiments the camera array is initially positioned such that imaging devices of the camera array 102 are positioned under a well or a portion of a well of the sample holder. The controller 110 directs the motion control module 104 to move the camera array 102 to an initial position such the camera array 102 is at least a predetermined initial distance from the bottom of the sample holder. In some embodiments the predetermined initial distance is measured from a top surface of the camera array 102 to either a bottom or a top surface of the sample holder. In other embodiments, the predetermined initial distance is measured from the top surface of the objective associated with a particular camera in the camera array 102 and either the bottom or the top surface of the sample holder. Other ways of establishing the predetermined initial distance will be apparent to those who have skill in the art.

The controller 110 then directs the camera control module 106 to actuate imaging devices of the camera array 102 to obtain a set of images therefrom. The set of images comprises one image acquired by each imaging device. In some embodiments, the system 100 comprises one camera control module 106 for each image device disposed in the camera array 102. In other embodiments, the system 100 comprises one camera control module 106 that controls all of the imaging devices in the camera array 102. A set of images is provided to the pre-processing module 108. The set of images is stored as a candidate output image set in a memory associated with the pre-processing module 108. The candidate output image set includes one candidate output image associated with each image device of the camera array 102.

The controller 110 thereafter directs the motion control module 104 to move the camera array 102 a predetermined incremental distance towards the sample holder. In one embodiment, the predetermined incremental distance is determined from the depth-of-field of the objectives used with the image devices. For example, the predetermined incremental distance may be substantially identical to such depth-of-field or a fractional multiple of the depth-of-field. The controller 110 directs the camera control module 106 to actuate the imaging devices of the camera array 102 to acquire a further set of images. The further set of images is also provided to the pre-processing module 108 and the further set of images also comprises a further image acquired by each imaging device.

For each imaging device, the pre-processing module 108 uses a predefined selection criterion to determine if any portion of candidate image should be updated with a corresponding portion of the further image. Such selection criteria may include whether the portion of the further image has a higher intensity value, a lower intensity value, a higher gradient, better focus, and the like, than the corresponding portion of the candidate image. If the selection criterion is met, the portion of the candidate image is replaced with the corresponding portion of the further image. In one embodiment, the pre-processing module compares each pixel of the further image acquired by the imaging device with a corresponding pixel of the candidate output image associated with such imaging device. If a pixel of the further image has a better focus than a corresponding pixel in the candidate output image, the intensity value associated with the pixel in the candidate output image is replaced with the intensity value of the pixel in the further image. In one embodiment, a first pixel has better focus than a second pixel if the contrast between the first pixel and the immediate neighbors thereof is greater than the contrast between the second pixel and its immediate neighbors. In some embodiments, the contrast between a pixel and the immediate neighbors thereof may be estimated by calculating an average of the differences in intensity between such pixel and each immediate neighbor. In some embodiments, if a pixel of the further image has a higher intensity value than a corresponding pixel of the candidate output image, the intensity value of the pixel of the candidate image is replaced the intensity value of the pixel of the further image. Such embodiments may be useful if the images are of a sample that is fluorescent. In other embodiments, if a pixel of the further image has a lower intensity value than a corresponding pixel of the candidate output image, the intensity value of the pixel of the candidate image is replaced with the intensity value of the pixel of the further image.

In still another embodiment, the intensity value of a pixel of the further image is added to the intensity value of the corresponding pixel of the candidate image. The image that results from such an embodiment may be useful in quantifying the amount of fluorescent material present in the sample. Other ways of developing the candidate output image apparent to those who have skill in the art may be used.

The controller 110 then directs the motion control module 104 to move the camera array 102 toward the sample holder a distance identical to the predetermined interval distance. The controller 110 thereafter directs the camera control module 106 to actuate the imaging devices of the camera array 102 to acquire a still further set of images. The still further set of images are processed by the pre-processing module 108 as described above to update the images that comprise the candidate set of output images. The parallel image acquisition system 100 is operated in this fashion until the camera array 102 has traversed a predetermined range toward the sample holder. In some embodiments, such predetermined range may be based on an expected variation in the curvature or other variation of the bottom surface of the sample holder. In some embodiments, the manufacturer of the sample holder may provide information regarding such expected variation. In other embodiments, measuring one or more sample holders may develop such expected variation. In some embodiments, the predetermined range is between approximately 50 mm and approximately 500 mm. Other ways of establishing the predetermined range will be apparent to those who have skill in the art.

After camera array 102 has traversed the predetermined range towards the sample holder, the controller 110 directs the pre-processing module 108 to provide the set of candidate output images as a set of in-focus output images of the parallel image acquisition system 100. Such set of in-focus output images may be provided to an image storage subsystem and/or an image processing and measurement subsystem associated with the system 100. In some cases, the controller 110 may transmit (for example, over a network or a communication channel) the set of in-focus output images to a separate system for further processing. In some embodiments, the pre-processing module 108 clears the candidate output images from the memory of the pre-processing module 108.

In addition, the controller 110 directs the motion control module 104 to move the camera array 102 away from the sample holder until the distance between the camera array 102 and the sample holder is substantially identical to the predetermined initial distance. The controller 110 thereafter directs the motion control module 104 to move the camera array 102 in a direction substantially parallel to the sample holder so that the imaging devices of the camera array 102 are positioned under a further measurement location that has not yet been imaged. In some embodiments, if the field-of-view of the imaging devices is smaller than a well, the further measurement location may be another portion of the wells just captured. The controller 110 directs the motion control module 104, the camera control module 106, and the pre-processing module 108 as described above to develop another set of in-focus output images as described above. Additional sets of in-focus output images are developed in this manner until all of the measurement locations of the sample holder have been imaged.

In some embodiments, instead of updating each candidate output image on a pixel-by-pixel basis, the pre-processing module 108 compares the focus of a captured image to the focus of a corresponding candidate output image. The captured image replaces the corresponding candidate output image if the focus of the captured image is evaluated as being better. The focus of an image may be evaluated, for example, by applying a gradient or an edge detection filter over the image and generating an average of the gradients or detected edges. Other ways of evaluating the focus of an image or comparing the focus of two images will be apparent to those who have skill in the art. Further, it should be apparent that a portion of the candidate image larger than a pixel and smaller than the entire candidate image may be compared with a corresponding portion from the further image to update the candidate image.

In some embodiments of the parallel image acquisition system 100, camera array 102 is held fixed and the motion control module 104 causes movement of the sample holder relative to the camera array 102. In still other embodiments, the motion control module 104 moves both the sample holder and the camera array 102. For example, the motion control module 104 may move camera array 102 to increase or decrease the distance between the sample holder and the camera array 102 and move the sample holder in directions parallel to the camera array 102 to enable imaging of the various measurement locations on the sample holder. Other ways of the enabling relative movement between the camera array 102 and the sample holder will be apparent to those who have skill in the art.

In some embodiments, the motion control module 104 may move or adjust the focus of the lenses associated image acquisition electronics of the camera array 102 instead of moving either the camera array 102 or the sample holder.

Some embodiments of the parallel image acquisition system 100 include an independent camera control module 106 for each imaging device disposed in the camera array 102. In such embodiments, the controller 110 operates all such camera modules 106 substantially concurrently to control the imaging device as described above. In some embodiments, the parallel image acquisition system 100 may include an independent pre-processing module 108 for each imaging device. The controller 110 directs the operation of such plurality of pre-processing modules 108 substantially concurrently as described above. It should be apparent that an imaging device in the camera array 102 may be operated asynchronously with the pre-processing module 108. In such cases, an image acquired by the imaging device may be buffered either in the imaging device, the camera control module 106, or the pre-processing module 108 until such image can be processed by the pre-processing module 108 in the manner described above.

Figure 2:
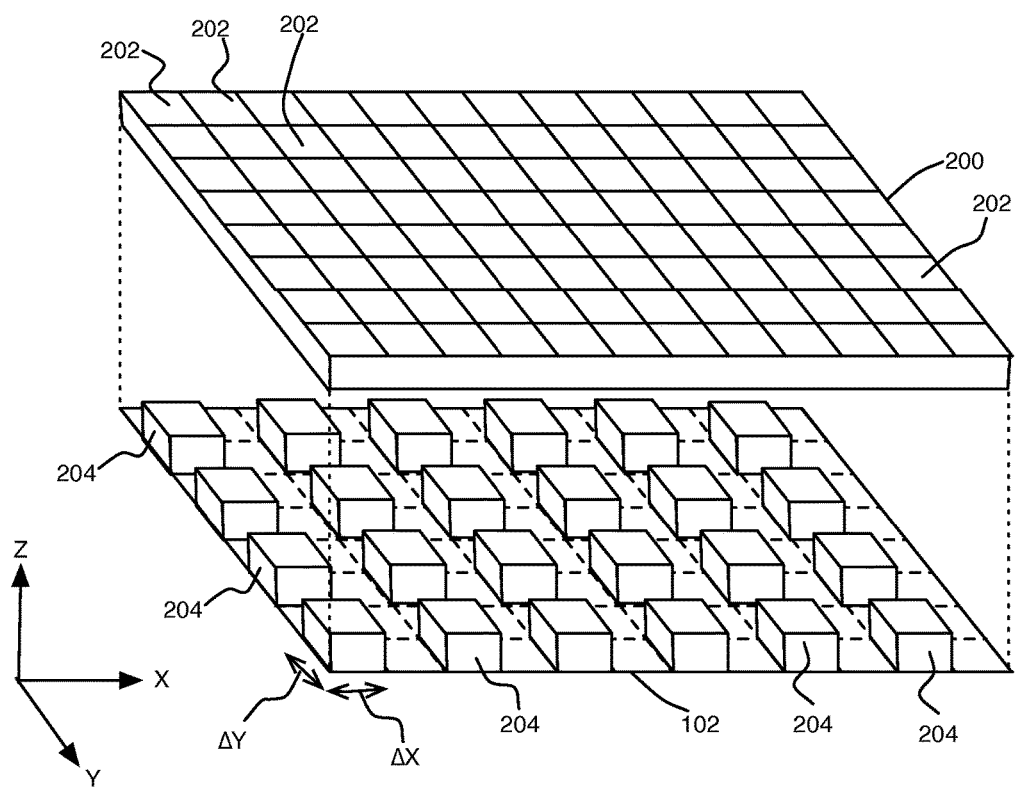
FIG. 2 is a schematic drawing of a sample holder and a camera array of the parallel image acquisition system of FIG. 1.

Referring to FIG. 2, one embodiment of the parallel image acquisition system 100 described above includes a sample holder 200. The sample holder 200 includes measurement locations 202. The camera array 102 includes imaging devices 204 disposed in a two-dimensional pattern. In such embodiment, the controller 110 directs the motion control module 104 to cause a relative movement between the camera array 102 in a direction parallel to the Z-axis in increments identical to the predetermined incremental value. Further, the controller 110 operates the camera control module 106 and the pre-processing module 108 as described above to develop a first set of in-focus output images of the measurement locations 202 that aligned with the imaging devices 204. Thereafter, the controller 110 directs the motion control module 104 to cause a relative movement of a distance ΔX between the sample holder 200 and the camera array 102 in a direction parallel to the X-axis and a distance ΔY in a direction parallel to the Y-axis. Thereafter, the controller 110 directs the motion control module 104, the camera control module 106, and the pre-processing module 108 to develop a second set of in-focus output images of measurement locations 202 that became aligned with the imaging devices after the movement in the directions parallel to the X-axis and the Y-axis.

Figure 3:
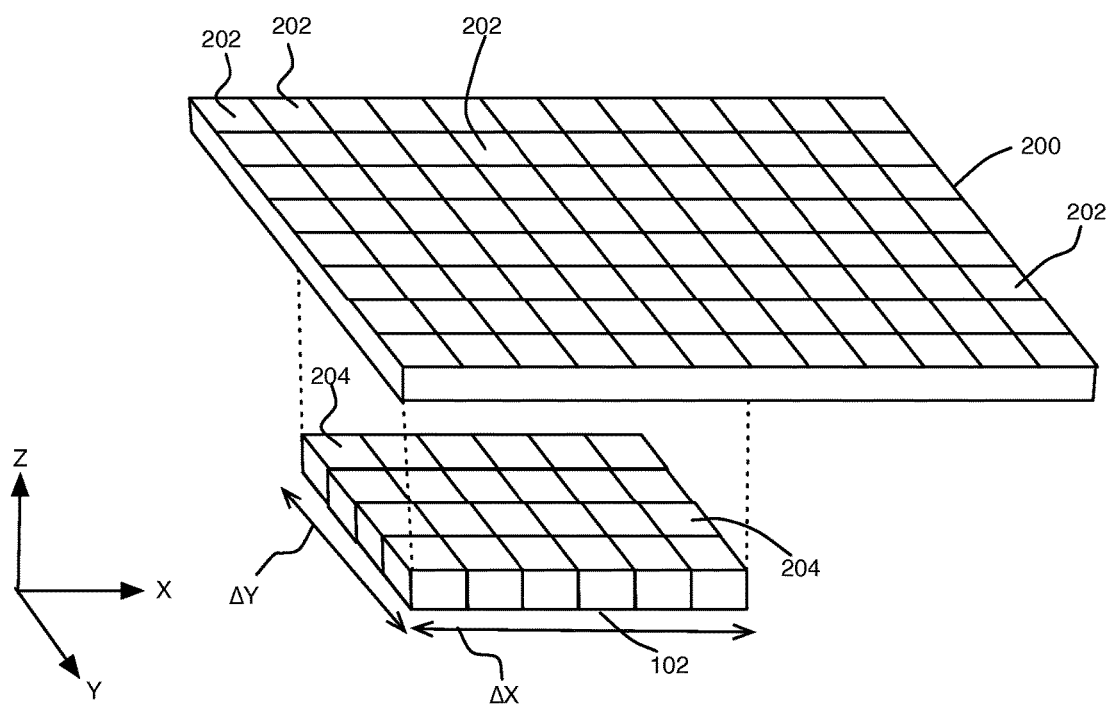
FIG. 3 is another schematic drawings of a sample holder and a camera array of the parallel image acquisition system of FIG. 1.

FIG. 3 shows another arrangement of imaging devices 204 on a camera array 102 that may be used as described above.

In some embodiments, the camera array 102 may include one imaging device 204 for every measurement location 202 of the sample holder 200. It should be apparent that in such embodiments, the controller 110 directs the motion control module 104 to move the camera array 102 only in a direction parallel to the Z-axis.

Other two dimensional arrangements of imaging devices 204 in an camera array 102 will be apparent to those who have skill in the art.

Figure 4:
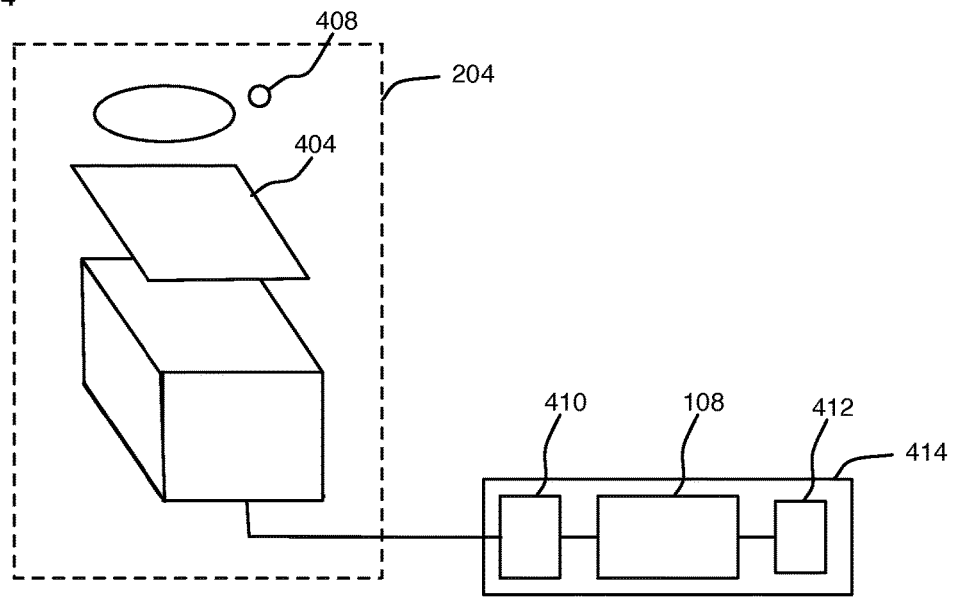
FIG. 4 is an exploded view showing the components of an imaging device that may be used in the parallel image acquisition system of FIG. 1.
Figure 5:
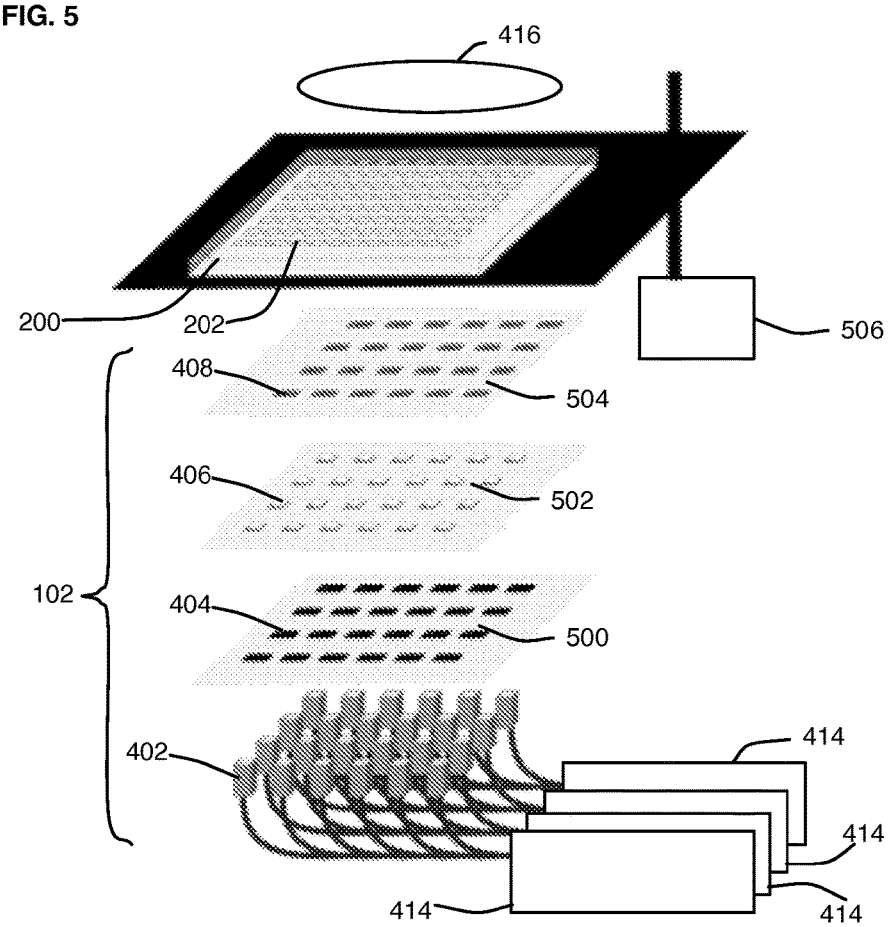
FIG. 5 is an exploded view of a camera array and sample holder of the imaging device of FIG. 1.

Referring to FIGS. 4 and 5, an imaging device 204 comprises image acquisition electronics 402 including, for example, a CCD or a CMOS chip and associated electronics. Disposed in the light path between the sample holder 200 and the image acquisition electronics 402 may be one or more filters 404 and/or lenses 406. A light source 408 such as a light emitting diode (LED) may also be disposed between the image acquisition electronics 402 and the sample holder 200. The light source 408 is disposed such that the light source 408 does not interfere with the light path between the sample holder 200 and the image acquisition electronics 402. During operation, light emitted by the light source 408 reflects off of the measurement location 202 that is to be imaged, passes through the lens 406 and the filter 404, and is sensed by the image acquisition electronics 402. In other embodiments, the light emitted by the light source 408 excites fluorescent molecules of the sample at the measurement location 202. The light emitted by such fluorescent molecules in response to such excitation passes through the lens 406 and the filter 404, and is sensed by the image acquisition electronics 402.

In some embodiments, a further light source 416 may be disposed such that the sample holder 200 is between the further light source 416 and the image acquisition electronics 402. The light from the further light source 416 is transmitted through the sample disposed in the sample holder 200 at the measurement location 202 to be imaged, through the lens 406 and the filter 404, and is sensed by the image acquisition electronics 402. In some applications, only the light source 408 may be used to illuminate the sample disposed in the sample holder 200. In other applications, only the light from the further light source 416 may be used to illuminate such measurement location. In still other applications, light from both the light source 408 and the further light source 416 may be used, either simultaneously or separately, to illuminate such measurement location. In some embodiments, if the light from both the light source 408 and further light source 416 are used separately to image particular measurement locations 202, a first set of in-focus output images is developed using the light source 408. The camera array 102 is then positioned to a distance identical to a predetermined initial distance from the sample holder 200 and a second set of in-focus output images is developed using the light source 416. The camera array 102 is thereafter positioned such that the imaging devices 204 thereon are aligned with further measurement locations 202 of sample holder 200 that have not been imaged.

In some embodiments, the camera control module 106 may direct the camera array 102 to capture multiple images of the measurement location each time the camera array 102 is repositioned to develop a plurality of image channels. For example, one channel may be developed when the measurement location is illuminated by the light source 408 and another channel may be developed when the measurement location is illuminated by the light source 416. In some embodiments, the light source 408 (or the light source 416) may be capable of producing different wavelengths of light. In such cases, the sample is illuminated with each such wavelength of light and an image channel associated with such wavelength of light is acquired. For example, the image source 408 may comprise a plurality of LEDs, wherein each LED emits a particular color of light. The camera control module 106 may actuate one or a combination of such LEDs for each image channel that is acquired. In some embodiments, the filter 404 may comprise one or more sub-filters wherein each sub-filter allows one or more wavelengths of light to pass therethrough. The motion control module 104 may position each sub-filter in the light path between the measurement location and the camera acquisition device associated with such measurement location before an image channel is acquired. In this manner, an image channel may be produced for each such sub-filter. In some embodiments, an output image associated with the measurement location is developed for each channel. In other embodiments, the channels are combined to produce one output image. In some embodiments, two to six image channels are acquired for each measurement location.

In one embodiment, image data generated by the image acquisition electronics 402 of the imaging device are provided to the pre-processing module 108 through an interface 410. The pre-processing module 108 transmits output image sets developed by the pre-processing module 108 to other systems (not shown) through an interface 412. The interfaces 410 and 412 may be in accordance with a Universal Serial Bus (USB) interface, a FireWire® or IEEE 1394 interface, an Ethernet® interface, or any other interface apparent to one who has skill in the art. In one embodiment, the electronics that implement all or a portion of the interfaces 410 and 412, and the pre-processing module 108 are implemented on a single-board computer 414. The single-board computer 414 may include a plurality of interfaces 410 to couple to a plurality of imaging acquisition electronics 402, a plurality of pre-processing modules 108, and a plurality of output interfaces 412.

Referring once again to FIG. 5, the filters 404 may be disposed on a filter holder 500, the lenses 406 may be disposed on a lens holder 502, and the light sources 408 may be disposed on a light source holder 504. In this manner, the filters 500, the lenses 406, and light sources 408 may be readily interchanged with other filters 406, lenses 406, and/or light sources 408 as desired based on the sample disposed at the measurement location 204 being imaged.

It should be apparent that the order in which the filter holder 500, the lens holder 502, and the light source holder 504 are disposed relative to one another may be varied. In some embodiments, the lens holder 502 may be disposed between sample holder 200 and the filter holder 500. In other embodiments, the filter holder 500 may be disposed between the sample holder 200 and the filter holder 500. In some cases, the lens holder 502 and the light source holder 504 may be disposed such that the light from the light sources 408 passes through the lenses 406 before reaching the sample holder 200. In other cases, the filter holder 500, the lens holder 502, and the light source holder 504 may be disposed such that the light from the light sources 408 passes through one or both of the filters 404 and the lenses 406 before reaching the sample holder 200.

It should be apparent to one who has skill in the art, that the camera array 102 may be mounted on an X-Y-Z stage operated by one or more motors 506. Alternately, as described above, the sample holder 200 may be mounted on an X-Y-Z stage operated by the motors 506.

Figure 6:
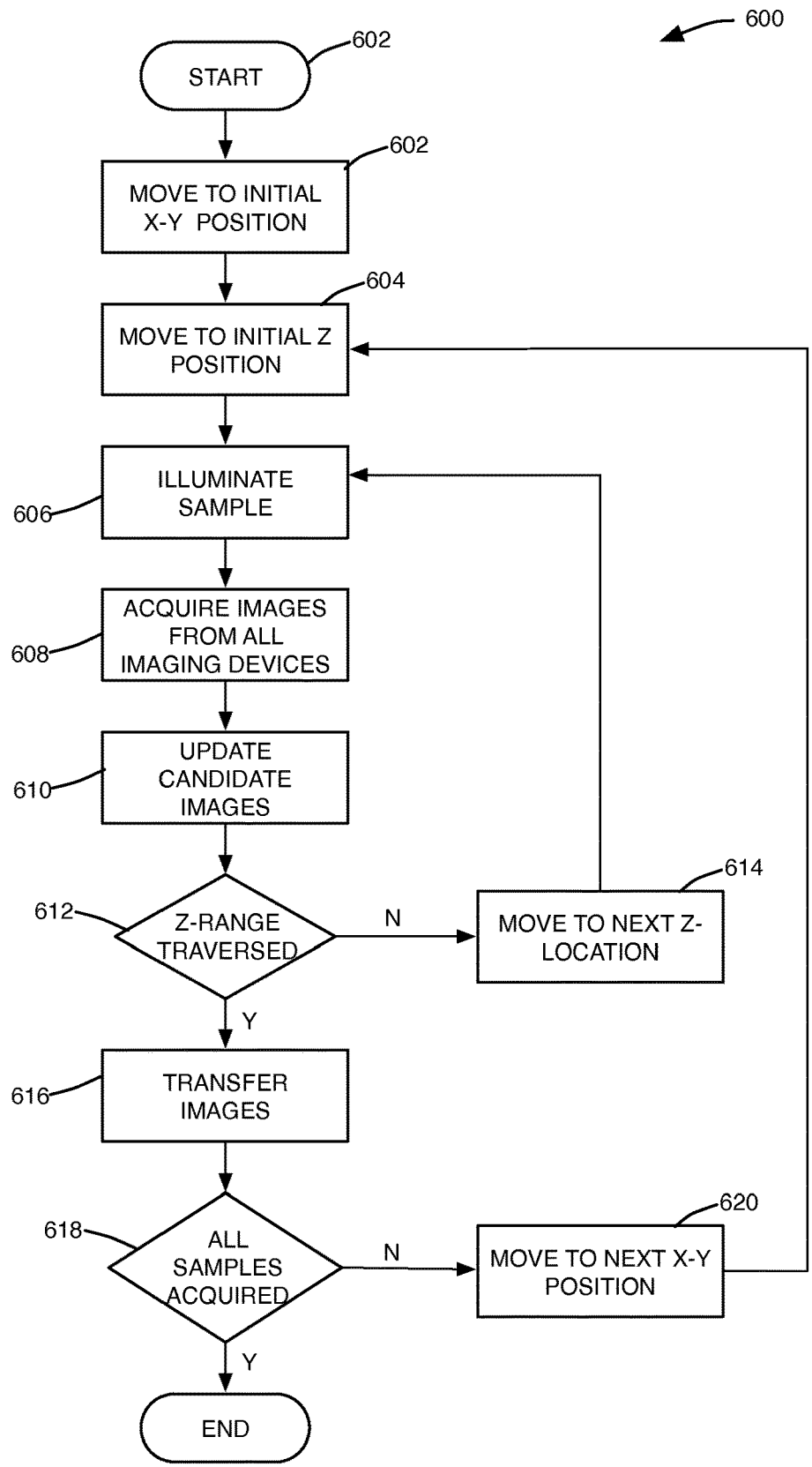
FIG. 6 is a flowchart of processing undertaken by the parallel image acquisition system to develop in-focus images in parallel.

Referring to FIG. 6, a flowchart 600 shows example steps undertaken by the parallel image acquisition system 100 to develop a set of in-focus output images in parallel. At step 602, the motion control module 104 positions the camera array 102 relative to the sample holder 200 such that the imaging devices 204 disposed on the camera array 102 are aligned with measurement locations 202 of the sample holder 200. At step 604, the motion control module 104 positions the camera array 102 relative to the sample holder 200 such that the distance therebetween is substantially identical to the predetermined initial distance. At step 606, the camera control module illuminates the measurement locations 202 by actuating one or both of the light sources 408 and 416. As described above, in some embodiments the light source 408 may emit light that excites the samples disposed at the measurement locations 202 and causes fluorescence of such samples. At step 608, the camera control module 106 directs each of the imaging devices 204 disposed in the camera array 102 to capture an image and transmit such image to the pre-processing module 108 associated with such imaging device 204. If the system 100 is to capture multiple image channels as described above, all of the image channels are captured without altering the position of the camera array 102 relative to the sample plate 200, at the step 608.

At step 610, the pre-processing module 108 analyzes an image received from the imaging device 204 and updates the candidate output image associated with such device as described above. If the pre-processing module 108 is associated with multiple imaging devices 204, the candidate output images associated with each respective imaging device 204 are updated.

The controller 110 then determines if the camera array 102 has traversed the predetermined range, at step 612. If the camera array 102 has not traversed the predetermined range, the motion control module 104, at step 614, moves the camera array 102 a distance identical to the predetermined incremental distance towards the sample holder 200 (i.e., in a direction parallel to the Z-axis). Thereafter, the parallel image acquisition system 100 proceeds to step 606.

If at step 612, the controller 110 determines that the predetermined range has been traversed, the controller 110 directs the pre-processing module 108 to transmit the updated candidate images through the interface 412, at step 616.

At step 618, the controller 110 determines if all of the measurement locations 202 of the sample holder 200 have been imaged. If so, the parallel image acquisition system 100 exits. Otherwise, at step 620, the motion control module 104 positions the camera array 102 relative to the sample holder 200 so that imaging devices 204 are aligned with measurement locations 202 that have not been imaged (i.e., moves the camera array 102 distances ΔX and ΔY parallel to the X-axis and the Y-axis, respectively). The parallel image acquisition system 100 then proceeds to step 604 to image such locations.

It will be understood and appreciated that one or more of the modules, processes, sub-processes, and process steps described in connection with FIGS. 1-6 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1-6. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the motion control module 104, the camera control module 106, the pre-processing module 108, the imaging device 204, and the camera array 102), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that receiving and transmitting of data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

What is claimed:

1. A method of generating an in-focus image of a measurement location of a sample holder in a microscopy imaging system, the method comprising:
   (a) positioning a plurality of imaging devices at a first distance from the sample holder, wherein an imaging device of the plurality of imaging devices corresponds to a respective measurement location;
   (b) acquiring a first set of images at respective measurement locations using the plurality of imaging devices;
   (c) developing a set of candidate output images associated with the plurality of imaging devices in accordance with the first set of images;
   (d) moving the plurality of imaging devices by a predetermined distance relative to the sample holder;
   (e) acquiring a second set of images at the respective measurement locations using the plurality of imaging devices;
   (f) updating at least a portion of the respective ones of the set of candidate output images with at least a portion of the respective second set of images in accordance with a selection criterion; and
   (g) transmitting the set of updated candidate output images,
   wherein the steps of moving the plurality of imaging devices, acquiring the second set of images and updating respective ones of the set of candidate output images are undertaken sequentially a plurality of times before the set of updated candidate output images is transmitted.

2. The method of claim 1, wherein the steps of moving the plurality of imaging devices, acquiring the second set of images, and updating the respective ones of the set of candidate output images are repeated until the plurality of imaging devices has traversed a predetermined range.

3. The method of claim 1, wherein a first imaging device of the plurality of imaging devices and a second imaging device of the plurality of imaging devices acquire respective ones of the first set of images substantially simultaneously.

4. The method of claim 1, wherein updating the at least a portion of the candidate output image comprises updating a pixel of the candidate output image.

5. The method of claim 4, wherein updating the at least a portion of the candidate output image further comprises comparing an intensity value of the pixel of the candidate image with an intensity value of a neighboring pixel thereof to develop a first evaluation of focus, and comparing the intensity value of a corresponding pixel of the second image with a neighboring pixel thereof to develop a second evaluation of focus.

6. The method of claim 5, wherein updating the pixel of the candidate output image further comprises replacing the intensity value of the pixel of the candidate output image with the intensity value of the corresponding pixel of the second image if the second evaluation of focus is greater than the first evaluation of focus.

7. The method of claim 1, further comprising:
(h) translating the plurality of imaging devices substantially in parallel to the sample holder such that the imaging device of the plurality of imaging devices corresponds to a different respective measurement location; and
(i) developing a second set of updated candidate output images, at the different respective measurement locations, the second set of updated candidate output images developed at least by acquiring a third set of images at the different respective measurement location, moving the plurality of imaging devices by a predetermined distance relative to the sample holder, and acquiring a fourth set of images after moving the predetermined distance at the different respective measurement location.

8. The method of claim 1, wherein the plurality of imaging devices include image acquisition electronics, and further comprising:
(h) positioning a first filter in a light path between the respective measurement locations and the imaging acquisition electronics, wherein the first filter is positioned in the light path when the first set of images is acquired; and
(i) positioning a second filter in the light path between the respective measurement locations and the imaging acquisition electronics, wherein the second filter is positioned in the light path when the second set of images is acquired.

9. The method of claim 8, wherein the position of the plurality of cameras relative to the sample holder when the first set of images are acquired is substantially identical to the position of the plurality of cameras relative to the sample holder when the second set of images are acquired.

10. The method of claim 1, wherein the first set of images is acquired using a first illumination condition and the second set of images is acquired using a second illumination condition.

11. A microscopy imaging system for acquiring in-focus images of respective measurement locations of a sample holder, comprising:
a plurality of imaging devices;
a motion controller for positioning the plurality of imaging devices relative to the sample holder; and
a pre-processing module associated with an imaging device of the plurality of imaging devices, the pre-processing module receiving images acquired by the imaging device,
wherein the motion controller positions the plurality of imaging devices at a plurality of distances from the sample holder, the plurality of imaging devices acquire, at a respective one of the plurality of distances, a first set of images of the respective measurement locations, and the preprocessing module develops a set of candidate output images associated with the plurality of imaging devices in accordance with the first set of images, and updates, at the respective one of the plurality of distances, at least a portion of the set of candidate output images with at least a portion of a second set of images at a different respective one of the plurality of distances in accordance with a selection criterion.

12. The microscopy imaging system of claim 11, wherein the plurality of distances is within a predetermined range and the predetermined range is associated with the sample holder.

13. The microscopy imaging system of claim 11, wherein a first imaging device of the plurality of imaging devices and a second imaging device of the plurality of imaging devices acquire respective ones of the first set of images substantially simultaneously.

14. The microscopy imaging system of claim 11, wherein the pre-processing module sets an intensity value of a pixel of the a candidate output image of the set of candidate output images to one of an intensity value of a corresponding pixel of a first image of the first set of images or an intensity value of a corresponding pixel of a second image of the second set of images.

15. The micrococopy imaging system of claim 14, wherein the pre-processing module compares the intensity value of the corresponding pixel of the first image with neighboring pixels thereof to develop a first evaluation of focus and compares the intensity value of the corresponding pixel of the second image with neighboring pixels thereof to develop a second evaluation of focus.

16. The microscopy imaging system of claim 15, wherein the intensity value of a pixel of the in-focus image that corresponds to the pixel of the first image is identical to the intensity value of the pixel of the first image if the first evaluation of focus is greater than the second evaluation of focus.

17. The microscopy imaging system of claim 11, wherein the motion controller causes a lateral translation of the plurality of imaging devices substantially in parallel to the sample holder such that an imaging device of the plurality of imaging devices corresponds to a different respective measurement location, and wherein the preprocessing module develops a second set of updated candidate output images at the different respective measurement locations.

18. The microscopy imaging system of claim 11, wherein the plurality of imaging devices include image acquisition electronics, and wherein a first filter is disposed in a light path between the sample holder and the image acquisition electronics when the plurality of imaging devices acquires the first set of images and wherein a second filter is disposed in the light path when the plurality of imaging devices acquires the second set of images.

19. The microscopy imaging system of claim 18, wherein the position of the plurality of imaging devices relative to the sample holder when the first set of images is acquired is substantially identical to the position of the plurality of imaging devices relative to the sample holder when the second set of images is acquired.

20. The microscopy imaging system of claim 11, wherein a first illumination source is actuated when the first set of images is captured and a second illumination source is actuated when a second set of images is captured.

* * * * *